US009618127B1

(12) United States Patent
Colpan et al.

(10) Patent No.: US 9,618,127 B1
(45) Date of Patent: Apr. 11, 2017

(54) MEMORY STOP

(71) Applicant: Mueller International, LLC, Atlanta, GA (US)

(72) Inventors: Umit Jon Colpan, Allentown, PA (US); Robert P. Jackson, Nazareth, PA (US)

(73) Assignee: Mueller International, LLC, Atlanta, GA (US)

( * ) Notice: Subject to any disclaimer, the term of this patent is extended or adjusted under 35 U.S.C. 154(b) by 58 days.

(21) Appl. No.: 14/918,815

(22) Filed: Oct. 21, 2015

(51) Int. Cl.
*F16K 37/00* (2006.01)
*F16K 5/10* (2006.01)

(52) U.S. Cl.
CPC ............ *F16K 5/10* (2013.01); *F16K 37/0008* (2013.01); *Y10T 137/8275* (2015.04)

(58) Field of Classification Search
CPC ........ F16K 5/10; F16K 1/523; F16K 37/0008; F16K 37/0016; Y10T 137/8275; Y10T 137/8292; Y10T 137/8309
USPC ............... 251/285–288; 137/553, 556–556.6
See application file for complete search history.

(56) References Cited

U.S. PATENT DOCUMENTS

| | | | | |
|---|---|---|---|---|
| 23,902 A | * | 5/1859 | Cope et al. .............. | B23K 5/22 251/285 |
| 914,209 A | * | 3/1909 | Watson ............... | F16K 37/0016 137/556.6 |
| 1,132,095 A | * | 3/1915 | Hutchison ........... | F16K 37/0016 137/556.6 |
| 1,420,664 A | * | 6/1922 | Maxwell ................ | F16K 15/18 251/285 |
| 1,936,301 A | * | 11/1933 | Hansen .................. | F16K 1/523 137/553 |
| 2,584,847 A | * | 2/1952 | Dahl ..................... | F16K 31/145 137/556.3 |
| 2,977,981 A | * | 4/1961 | Jarrett .................... | F16K 7/126 137/553 |
| 3,537,473 A | * | 11/1970 | Dezurik, Jr. ........ | F16K 37/0016 251/285 |
| 3,552,434 A | * | 1/1971 | Haenky .................... | F16K 5/08 137/556 |
| 4,782,856 A | * | 11/1988 | Siedhoff .................. | F16K 1/54 137/556.3 |
| 4,832,078 A | * | 5/1989 | Szekely .................. | F16K 31/44 251/285 |

(Continued)

OTHER PUBLICATIONS

Cameron; Brochure for "Dynatorque Gears and Automated Valve Accessories", publicly available prior to Oct. 21, 2015, 12 pgs.

(Continued)

*Primary Examiner* — John Bastianelli
(74) *Attorney, Agent, or Firm* — Taylor English Duma LLP

(57) ABSTRACT

A memory stop includes: a cover plate; a memory bracket secured to the cover plate, the memory bracket defining a plurality of stopper positions; and a stopper attached to the memory bracket at a one of the plurality of stopper positions. A method of using a memory stop includes: moving a stopper of the memory stop to a memory position, the memory stop including a cover plate, a memory bracket secured to the cover plate and defining a plurality of stopper positions, and the stopper attached to the memory bracket; and securing the stopper to the memory bracket at the memory position, wherein the memory position is at one of the plurality of stopper positions.

10 Claims, 12 Drawing Sheets

(56) References Cited

U.S. PATENT DOCUMENTS 6,019,129 A * 2/2000 Taha .................... F16K 35/022
137/553

OTHER PUBLICATIONS

Mastergear; Product sheet for "Memory Stop", publicly available prior to Oct. 21, 2015, 1 pg.
Victaulic; Product Sheet for "Memory Stop Kit Installation—Vic 300 Butterfly Valve", publicly available prior to Oct. 21, 2015, 2 pgs.

* cited by examiner

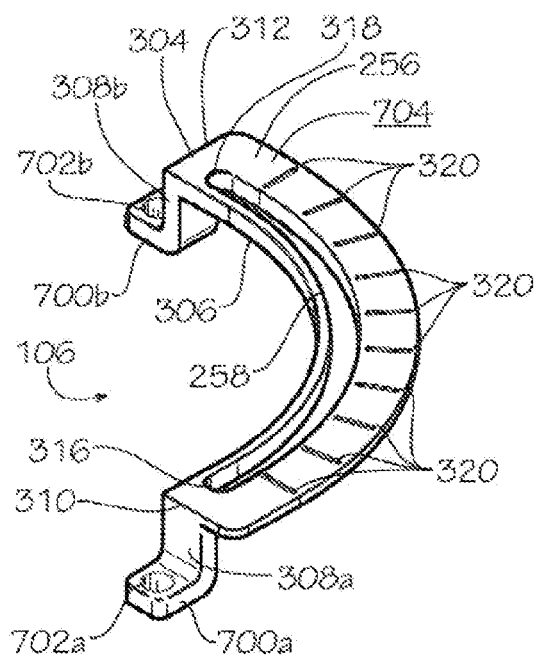
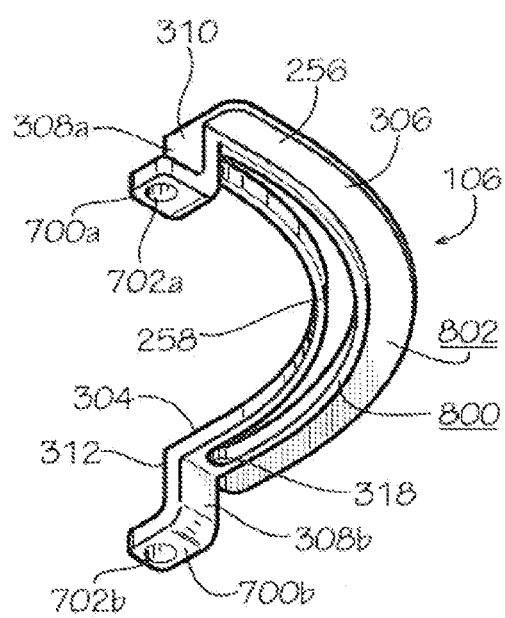
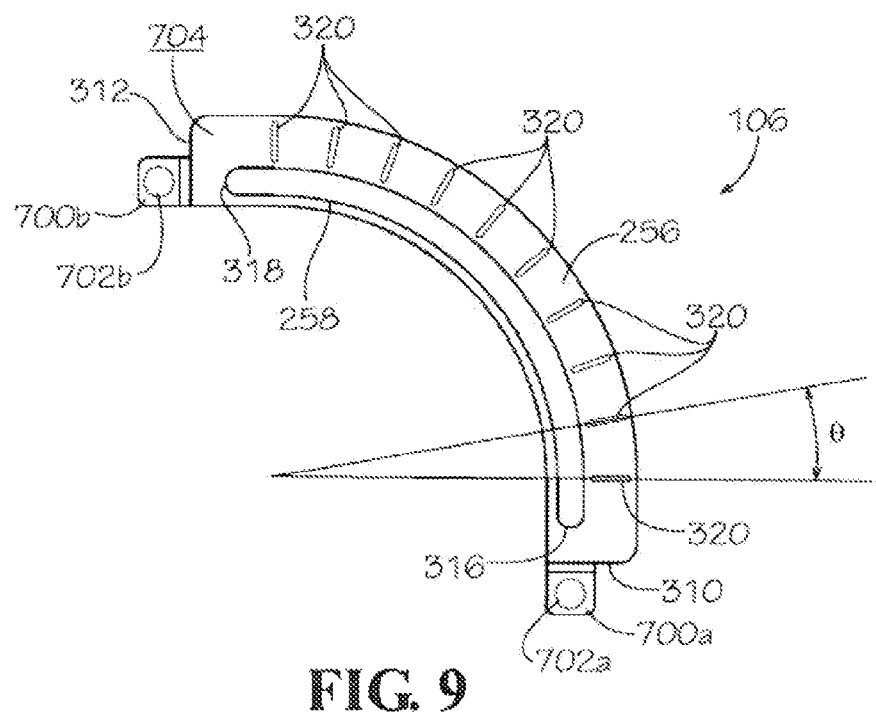
FIG. 7
FIG. 8
FIG. 9

MEMORY STOP

TECHNICAL FIELD

This disclosure relates to gear operators. More specifically, this disclosure relates to memory stops for gear operators.

BACKGROUND

Valves are used to regulate or control the movement of a fluid in a fluid system by opening and closing various passageways within the fluid system. For example, a balancing valve is a type of valve designed for balancing hot and cold water in a fluid system. Such a fluid system can be installed in structures such as commercial buildings, schools, hospitals, and a variety of other facilities that use hot or chilled water for heating or cooling or both. In some fluid systems, the valve may be opened or closed to various positions to achieve various fluid flow rates through the fluid system.

SUMMARY

Disclosed is a memory stop including: a cover plate; a memory bracket secured to the cover plate, the memory bracket defining a plurality of stopper positions; and a stopper attached to the memory bracket at a one of the plurality of stopper positions.

Also disclosed is a system including: a gearbox; and a memory stop including a cover plate secured to the gearbox, the memory stop further including a memory bracket secured to the cover plate, the memory bracket defining a plurality of stopper positions, and a stopper attached to the memory bracket at one of the plurality of stopper positions.

Also disclosed is a method of using a memory stop including: moving a stopper of the memory stop to a memory position, the memory stop including a cover plate, a memory bracket secured to the cover plate and defining a plurality of stopper positions, and the stopper attached to the memory bracket; and securing the stopper to the memory bracket at the memory position, wherein the memory position is at one of the plurality of stopper positions.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 7 is a perspective view of the memory bracket of FIG. 1.

FIG. 8 is another perspective view of the memory bracket of FIG. 1.

FIG. 9 is a top view of the memory bracket of FIG. 1.

DETAILED DESCRIPTION

Disclosed is a memory stop and associated methods, systems, devices, and various apparatus. The memory stop includes a cover plate, an indicator plate, and a memory bracket. It would be understood by one of skill in the art that the disclosed memory stop is described in but a few exemplary embodiments among many. No particular terminology or description should be considered limiting on the disclosure or the scope of any claims issuing therefrom.

Figure 1:
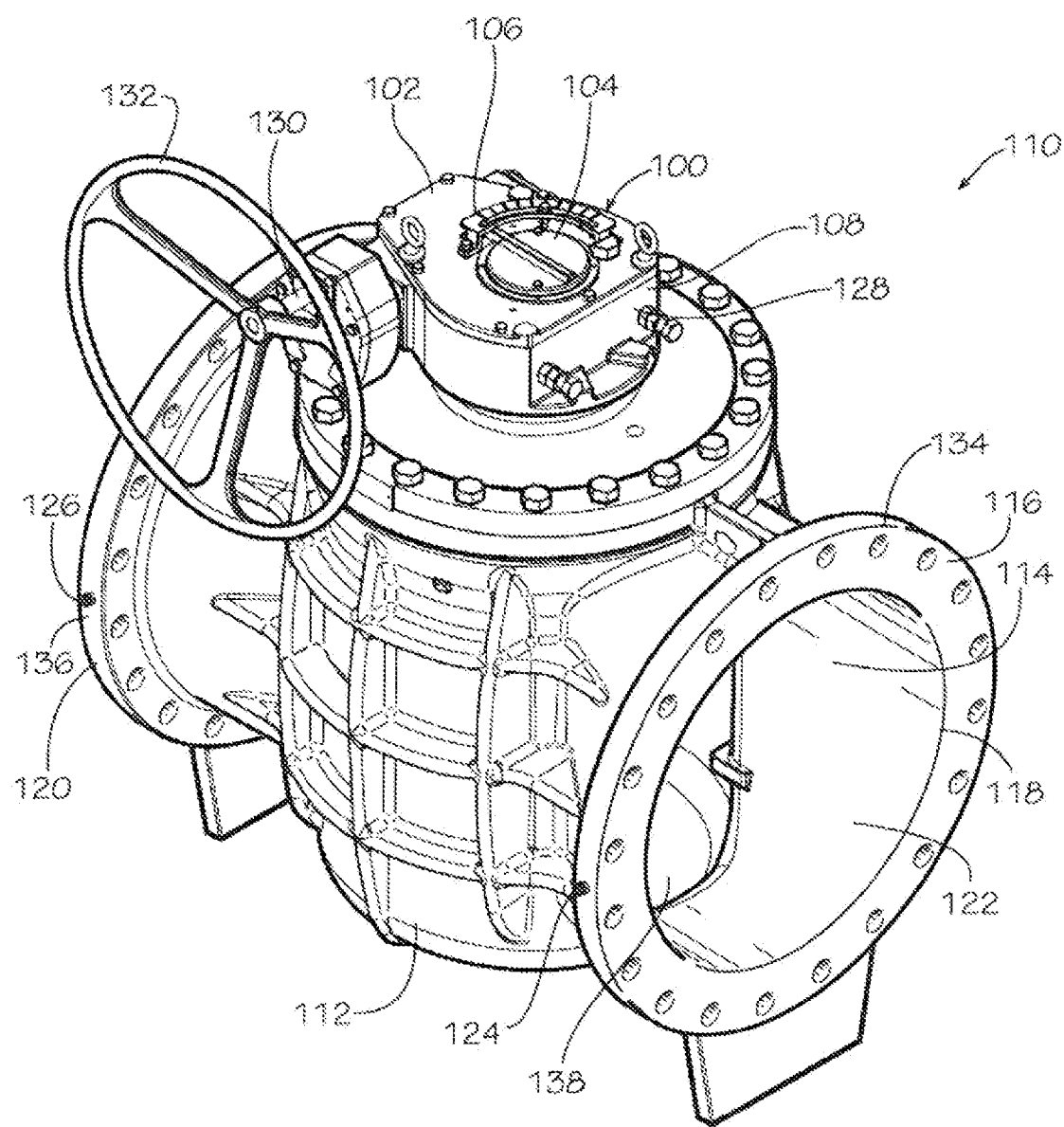
FIG. 1 is a perspective view of a memory stop according to a first embodiment of the present disclosure mounted on a gearbox of a valve assembly, the memory stop including a cover plate, an indicator plate, and a memory bracket.
Figure 2:
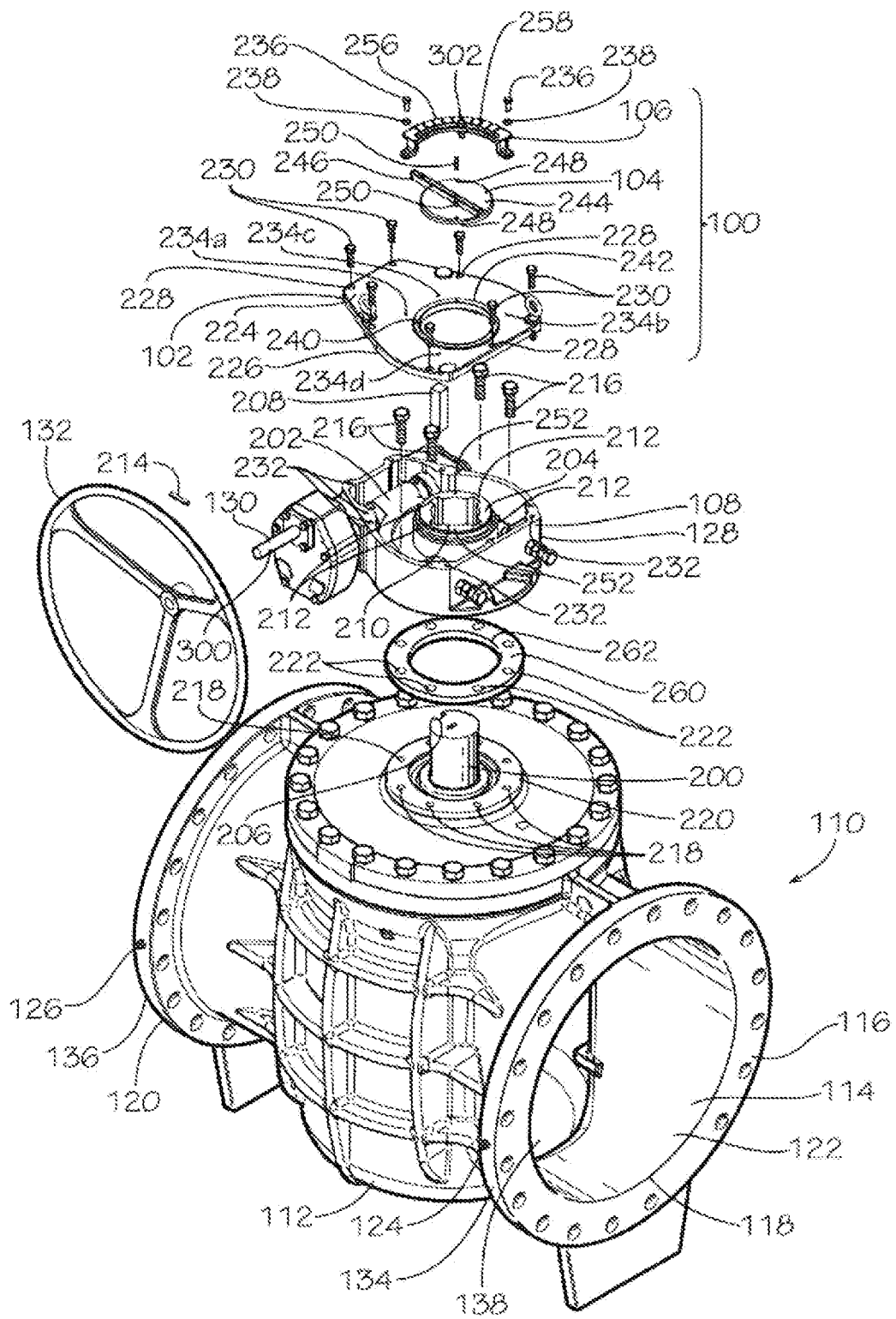
FIG. 2 is a partially exploded assembly view of the memory stop, gearbox, and valve assembly of FIG. 1.

One embodiment of a memory stop 100 is disclosed and described in FIG. 1. As shown in FIG. 1, the memory stop 100 includes a cover plate 102, an indicator plate 104, and a memory bracket 106. In the present embodiment, the memory bracket 106 is graduated. FIGS. 1 and 2 show the memory stop 100 mounted on a gearbox 108, which is mounted on a valve assembly 110 of a fluid system in various embodiments. In various embodiments, it is beneficial to be able to open or close a valve (not shown) of the valve assembly 110 to the exact same position with each use to maintain a desired flow through a fluid system. In various embodiments, such as with a balancing valve, it is beneficial to open the valve of the valve assembly 110 to a balance point, which is a position between a fully opened position and a fully closed position, to obtain a particular balance of hot and cold water within the fluid system.

The valve assembly 110 includes a body 112 with an interior 114 that is substantially continuous through the body 112 from an inlet 118 defined at a first end 116 to an outlet (not shown) defined at a second end 120. As shown in FIG.

1, in various embodiments, first end 116 includes a first end flange 134 and the second end 120 includes a second end flange 136; however, in various other embodiments, the first end 116 may not include the first end flange 134 or the second end 120 may not include the second end flange 136. The interior 114 defines a fluid bore 122 having a valve cavity 138. The valve cavity 138 and fluid bore 122 allow fluid flow through the valve assembly 110 such that in operation, fluid enters the valve assembly 110 at the inlet 118, flows through the fluid bore 122 and valve cavity 138, and exits the valve assembly 110 at the outlet.

In the current embodiment, the valve assembly 110 is a plug valve; however, the disclosure of the plug valve should not be considered limiting on the current disclosure as in various other embodiments, the valve assembly 110 may be any desired type of valve assembly such as a ball valve, a butterfly valve, gate valve, a cone valve, or various other valve types suitable for controlling fluid flow through the body 112. In the current embodiment, the valve assembly 110 includes a plug (not shown) in various embodiments within the valve cavity 138 of the body 112. In various embodiments, the plug is a half-moon shape. In various embodiments, the plug is a component of the valve assembly 110 that is rotated to open and close the valve cavity 138 and either prevents or permits fluid flow through the valve cavity 138. A valve stem 200 (shown in FIG. 2) is connected to the plug such that movement of the valve stem 200 moves the plug. Depending on a position of the plug within the valve cavity 138, the plug may either permit or prevent fluid flow through the body 112. When the plug is in an open position, fluid is allowed to flow through the interior 114 of the body 112 from the inlet 118 to the outlet. In a fully open position, the plug provides little to no obstruction of the flow path of the fluid through the body 112. When the plug is in a fully closed position, the plug blocks or prevents fluid flow through the body 112 from the inlet 118 to the outlet.

Figure 19:
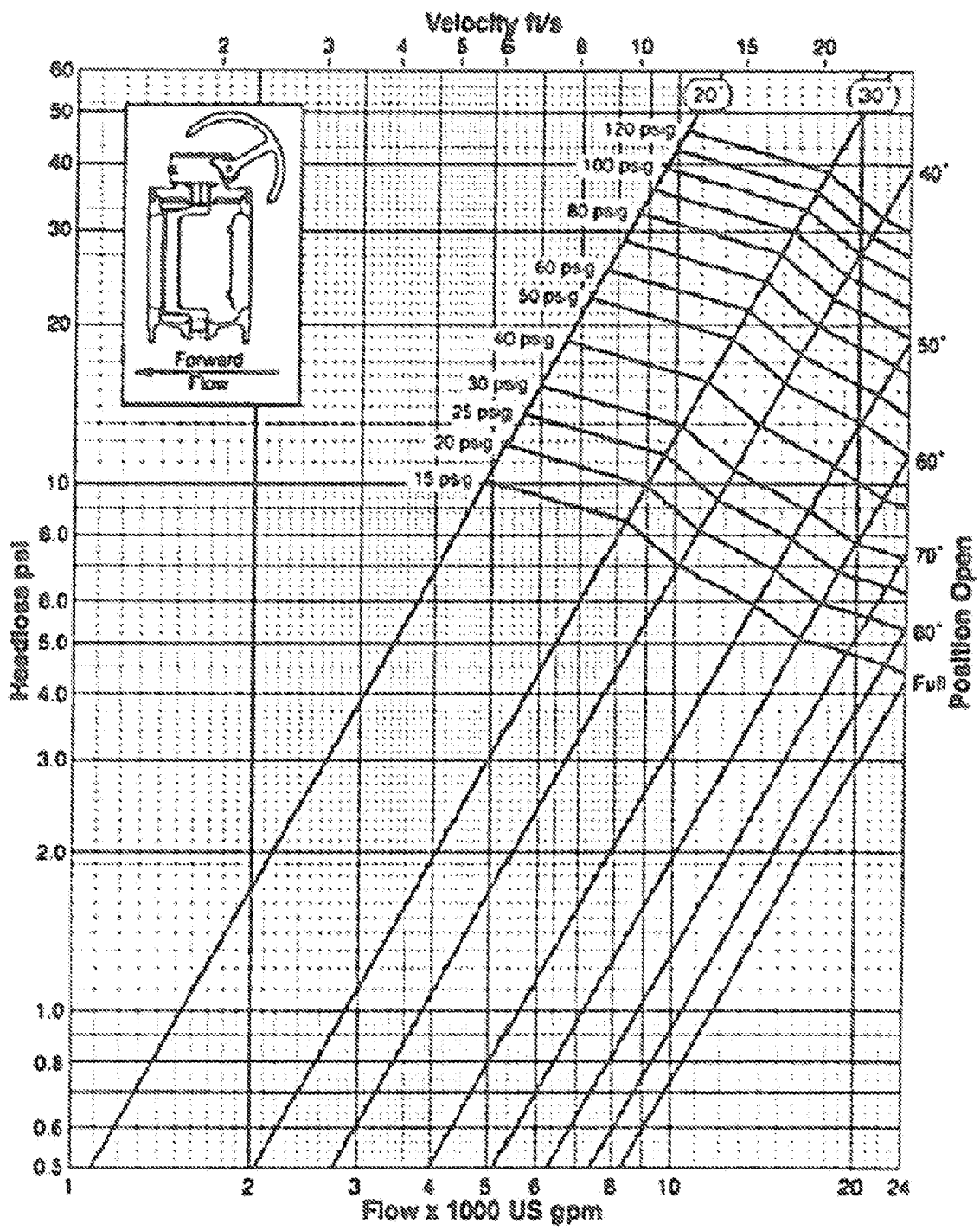
FIG. 19 is a chart showing the relationship between a head loss pressure within the valve assembly of FIG. 1, a velocity of a fluid through the valve assembly of FIG. 1, a position of a plug of the valve assembly of FIG. 1, and a flow rate through the valve assembly of FIG. 1.

In various embodiments, the valve assembly 110 includes an inlet pressure tap 124 defined in the body 112 proximate to the inlet 118 at the first end 116. The valve assembly 110 also includes an outlet pressure tap 126 defined in the body 112 proximate to the outlet at the second end 120 in various embodiments. A differential pressure meter (not shown) may be connected to the pressure taps 124,126 to measure the pressure drop across the valve assembly 110. The pressure drop across the valve assembly 110 is related to a velocity of a fluid through the valve assembly 110, a flow rate of the fluid through the valve assembly 110, and a position of the plug as shown in the chart of FIG. 19. Accordingly, the position of the plug may be adjusted to adjust the pressure drop across the valve assembly 110, the velocity of fluid, and the flow of fluid through the valve assembly 110.

An input shaft 130 may be connected to a gear 202 (shown in FIG. 2) housed in a body 128 of the gearbox 108 in various embodiments. In the present embodiment, a hand wheel 132 is mounted on the input shaft 130 and is adapted to rotate the input shaft 130. In various embodiments, the gear 202 is engaged with a quad gear segment 204 (shown in FIG. 2). The hand wheel 132 is thereby connected to the quad gear segment 204 through the input shaft 130 and the gear 202. The hand wheel 132 is utilized to rotate the quad gear segment 204 through the gear 202. The quad gear segment 204 is engaged with the valve stem 200 and is adapted to rotate the valve stem 200 as the gear 202 rotates the quad gear segment 204. The disclosure of the gearbox 108 having the body 128, gear 202, and quad gear segment 204 should not be considered limiting on the current disclosure as in various embodiments, any suitable gearbox or actuating mechanism for rotating the valve stem 200 may be utilized. The actuation mechanism may be selected from the group including, but not limited to, the hand wheel 132, a rod, a lever, a motor, or various other mechanisms suitable for at least indirectly rotating the valve stem 200.

In various embodiments, the hand wheel 132 is secured to the input shaft 130 through a securing pin 214 (shown in FIG. 2) secured in a pin bore 300 (shown in FIG. 2); however in various other embodiments, any suitable securing mechanism, such as pins (including cotter pins and roller pins), screws, nuts and bolts, keys or splines, weldments, or various other suitable securing mechanisms may be utilized to secure the hand wheel 132 to the input shaft 130. The disclosure of the hand wheel 132 should not be considered limiting on the current disclosure as in various other embodiments, various other mechanisms such as a rod, lever, motor, or various other mechanisms suitable for rotating the input shaft 130 may be utilized.

As previously described, rotation of the input shaft 130 causes rotation of the quad gear segment 204 through the gear 202. Accordingly, rotation of the quad gear segment 204 rotates the valve stem 200 and moves the plug between the open and closed position. The memory stop 100 is adapted to indicate the position of the plug within the body 112 as the plug is moved and positioned between the open and closed position. The disclosure of the valve gearbox 108 should not be considered limiting on the current disclosure as in various embodiments, any desired type of gearbox 108 may be utilized.

FIG. 2 shows a partially-exploded view of the memory stop 100, gearbox 108, and valve assembly 110. As shown in FIG. 2, in various embodiments, the valve stem 200 defines a stem notch 206 dimensioned to accept a key 208 within the notch 206. The valve stem 200 may be connected to the quad gear segment 204 of the gearbox 108 through the key 208 such that the quad gear segment 204 rotates the valve stem 200 and actuates the plug between the open and closed positions.

In various embodiments, four securing bolts 216 are utilized to secure the gearbox 108 to the valve assembly 110; however, the number of securing bolts 216 should not be considered limiting on the current disclosure. In addition, in various other embodiments, screws, pins, hooks, nuts and bolts, weldments, or various other securing mechanisms may be utilized to secure the gearbox 108 to the valve assembly 110. In various embodiments, the securing bolts 216 are positioned through securing bores (not shown) defined in the gearbox 108 to engage valve securing bores 218 on a mounting collar 220 of the valve assembly 110. In various embodiments, a riser ring 260, which is a spacer, is positioned around the valve stem 200 between the mounting collar 220 and the gearbox 108. In various embodiments, the securing bolts 216 are also positioned through riser bores 222 of the riser ring 260. In various embodiments, the riser ring 260 is annular shaped and defines a riser ring opening 262; however, the disclosure of the shape of the riser ring 260 should not be considered limiting on the current disclosure as in various other embodiments, the riser ring 260 may have any desired shape. The disclosure of the riser ring 260 should not be considered limiting on the current disclosure.

As previously described, in various embodiments, the gearbox 108 houses the gear 202 engaged to the quad gear segment 204 in the body 128 of the gearbox 108. The quad gear segment 204 defines a gear bore 210 with bore notches 212. In the present embodiment, the gear bore 210 includes four bore notches 212; however the number of bore notches 212 should not be considered limiting on the current disclosure as in various other embodiments, any desired number of bore notches 212, including no bore notches 212, may be included. In addition, the shape of the bore notches 212 should not be considered limiting on the current disclosure. In various embodiments, the quad gear segment 204 is adapted to receive the valve stem 200 in the gear bore 210 and adapted to receive the key 208 in one of the bore notches 212. In this manner, the key 208 engages both the quad gear segment 204 and the valve stem 200, and rotation of the quad gear segment 204 rotates the valve stem 200 through the key 208. The disclosure of the key 208 should not be considered limiting on the current disclosure as in various other embodiments, various other engagement mechanisms, such as a pin, bolt, hook, clasp, rod, or various other engagement mechanisms suitable for engaging the quad gear segment 204 with the valve stem 200 may be utilized such that the quad gear segment 204 rotates the valve stem 200.

The cover plate 102 of the memory stop 100 includes a top side 224 and a bottom side 226. In various embodiments, the cover plate 102 defines nine connecting bores 228 extending from the top side 224 to the bottom side 226 of the cover plate 102; however, the number of connecting bores 228 should not be considered limiting on the current disclosure as in various other embodiments, any desired number of connecting bores 228 may be utilized.

In various embodiments, the cover plate 102 is secured to the gearbox 108 with seven securing bolts 230 positioned in the connecting bores 228 of the cover plate 102 and through cover bores 232 defined in the body 128 of the gearbox 108. The number of securing bolts 230 should not be considered limiting on the current disclosure. In addition, the disclosure of securing bolts 230 as the securing mechanism should not be considered limiting on the current disclosure as in various other embodiments, any securing mechanism may be utilized suitable for securing the cover plate 102 to the gearbox 108, including, but not limited to, pins, screws, hooks, and various other mechanisms. In various other embodiments, the cover plate 102 is integral with the body 128 of the gearbox 108 such that the cover plate 102 is integral or monolithically formed with the side walls of the body 128. For example, in various other embodiments, the gearbox 108 includes a removable plate at a back of the body 128 opposite the side of the body 128 to which the memory stop 100 is attached.

The cover plate 102 also defines four retaining bores 234a,b,c,d in various embodiments. The cover plate 102 includes four bosses 1502a,b,c,d (shown in FIG. 15) on a cavity bottom surface 1606 (shown in FIG. 15) of the cover plate 102 at locations corresponding to the locations of the retaining bores 234a,b,c,d, respectively. However, the number of retaining bores 234 or bosses 1502 should not be considered limiting on the current disclosure as in various other embodiments, any desired number of retaining bores 234 or bosses 1502 may be utilized. In various embodiments, the retaining bores 234 are blind holes that extend from the top side 224 partially into the cover plate 102. The retaining bores 234 extend partially through the cover plate 102 to protect the gear 202 from external elements, such as dust or water, which may otherwise enter the gearbox 108 through the retaining bores 234 if they were to extend fully through the cover plate 102. The retaining bores 234 are adapted to receive retaining bolts 236, respectively, and secure the memory bracket 106 to the cover plate 102. In various embodiments, the retaining bolts 236 may be used with spacers 238 are to secure the memory bracket 106 to the cover plate 102. In the present embodiment, two retaining bolts 236 and two spacers 238 are utilized to secure the memory bracket 106 to the cover plate 102; however, the number of retaining bolts 236 or spacers 238 should not be considered limiting on the current disclosure. In addition, the disclosure of retaining bolts 236 and spacers 238 as the retaining mechanism should not be considered limiting on the current disclosure as in various other embodiments, any retaining mechanism may be utilized suitable for securing the memory bracket 106 to the cover plate 102, including, but not limited to, pins, screws, hooks, and various other mechanisms.

In various embodiments, the cover plate 102 includes more retaining bores 234 than are required to secure the memory bracket 106 to the cover plate 102. In these embodiments, the orientation of the memory bracket 106 relative to the cover plate 102 may be varied depending on which retaining bores 234 are utilized to retain the memory bracket 106 on the cover plate 102. For example, as shown in FIG. 1, the memory bracket 106 may be retained on the cover plate 102 opposite from the side where the input shaft 130 is connected to the gearbox 108. As illustrated in FIG. 1, when the input shaft 130 is connected to a left side of the gearbox 108, the retaining bores 234a,b may be utilized to retain the memory bracket 106 to the cover plate 102 such that the memory bracket 106 is over a right portion of the top side 224. In various embodiments when the input shaft 130 is connected to a right side of the gearbox 108 (not shown), the retaining bores 234c,d may be utilized to retain to memory bracket 106 to the cover plate 102 such that the memory bracket 106 is over a left portion of the top side 224.

In various embodiments, an operator may change the orientation of the memory bracket 106 relative to the cover plate 102 to control whether clock-wise rotation of the input shaft 130 opens the valve assembly 110 and counter-clock-wise rotation of the input shaft 130 closes the valve assembly 110, or vice versa, as described in greater detail below. Additionally, in various embodiments, because the orientation of the valve assembly 110 may be different in different installations, the operator may orient the memory bracket 106 to the most convenient orientation for the operator relative to the valve assembly 110.

As shown in FIG. 2, the cover plate 102 defines a segment bore 240 in various embodiments. In various embodiments, the cover plate 102 includes a segment collar 242 surrounding the segment bore 240 at the top side 224. The cover plate 102 may also include position indicators (not shown), such as "OPEN" or "CLOSED," imprinted on the top side 224 in various embodiments. In various other embodiments, the position indicators may be any desired position indicators such as words, text, colors, or various other types of position indicators. In addition, in various embodiments, the position indicators may be defined in the cover plate 102 or may be attached to the cover plate 102 through various connecting mechanisms such as adhesives, glues, welding, hooks, pins, nuts and bolts, or various other connecting mechanisms.

The indicator plate 104 includes a hub 244 and an indicator arm 246. In various embodiments, the hub 244 is positioned over the segment bore 240 of the cover plate 102 such that the hub 244 covers the segment bore 240. In various embodiments, the hub 244 contacts the segment collar 242. In various embodiments, the indicator plate 104 defines indicator plate bores 248 extending through the hub 244. In various embodiments, securing bolts 250 are positioned through the indicator plate bores 248 and the segment bore 240 to engage securing bores 252 defined in the quad gear segment 204. In this manner, the indicator plate 104 is secured to the quad gear segment 204 such that as the quad gear segment 204 rotates, the indicator plate 104 likewise rotates. The number of indicator plate bores 248, securing bolts 250, and securing bores 252 should not be considered limiting on the current disclosure as in various other embodiments, and desired number of indicator plate bores 248, securing bolts 250, and securing bores 252 may be utilized.

The memory bracket 106 includes a bracket body 256. In various embodiments, the memory bracket 106 defines a plurality of stopper positions, which may be positions in a channel, a series of holes, or a series of notches or other position indicators that a stopper 302 can be positioned at. In various embodiments, the bracket body 256 defines a stopper channel 258. As previously described, the memory bracket 106 is secured to the cover plate 102 through the retaining bolts 236 with the spacers 238 in various embodiments. In various embodiments, the stopper 302 is retained within the stopper channel 258, as described in greater detail below.

Figure 3:
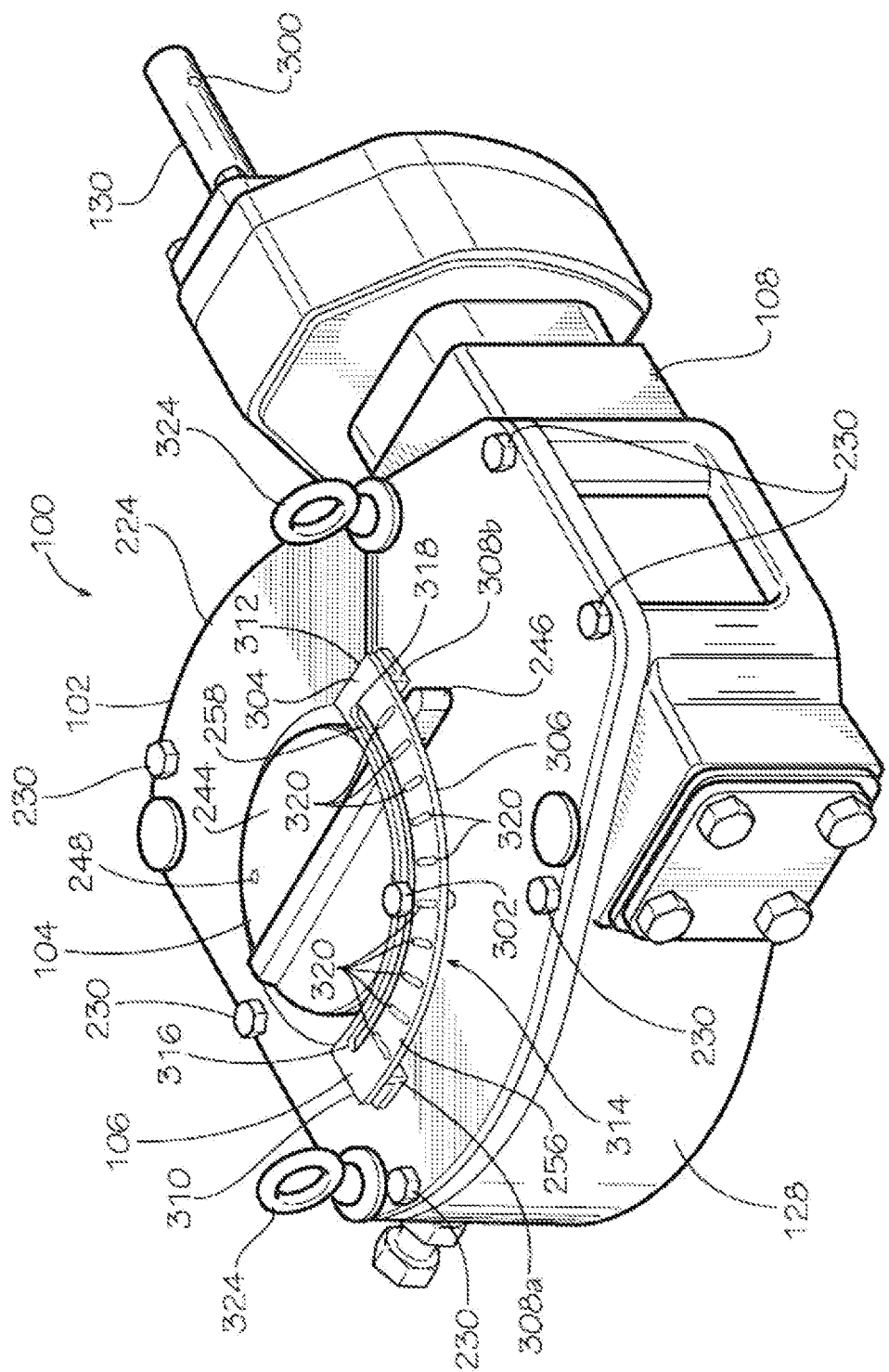
FIG. 3 is a perspective view of the memory stop of FIG. 1 mounted on the gearbox of FIG. 1, the memory stop including the cover plate, the indicator plate, and the memory bracket.
Figure 4:
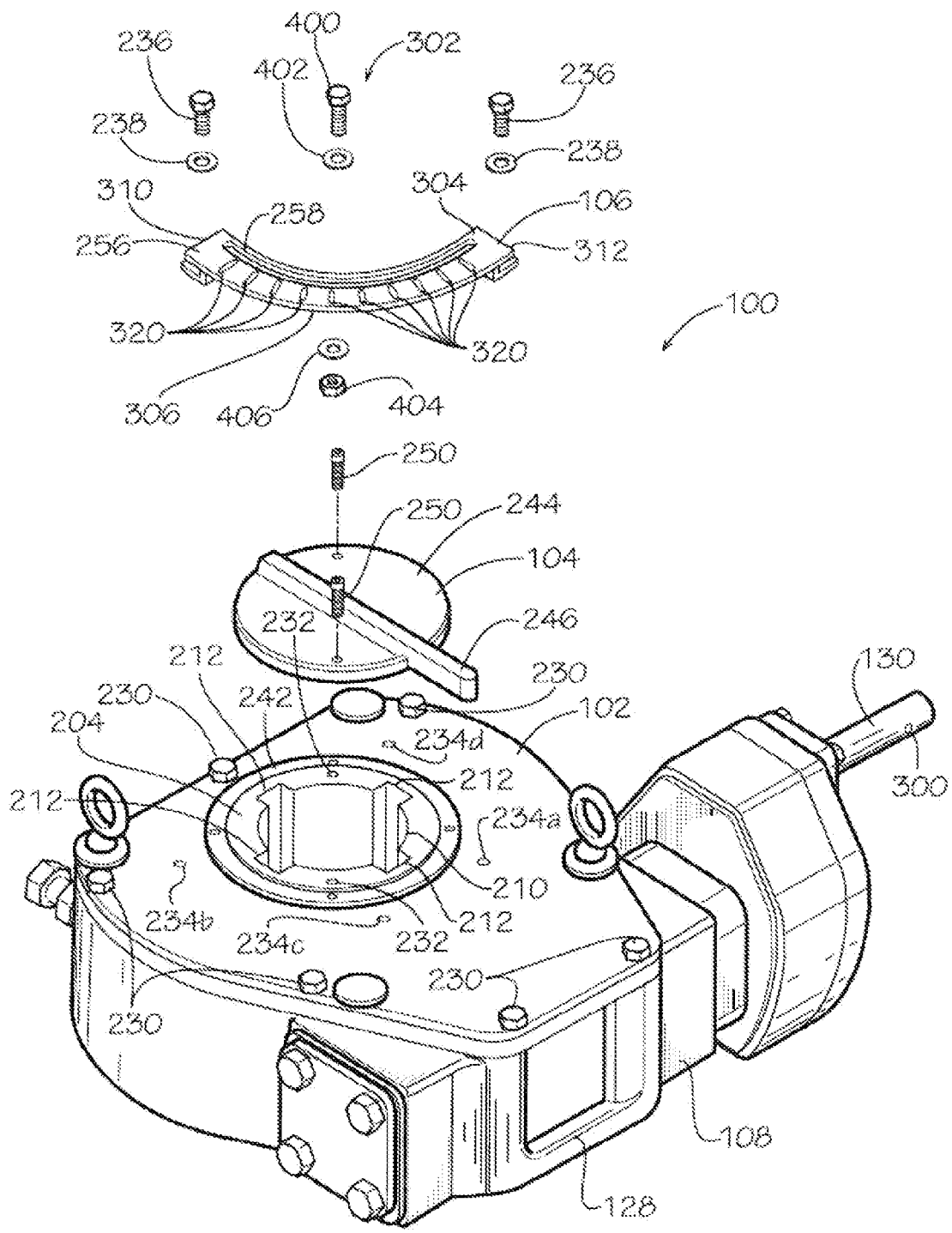
FIG. 4 is a partially exploded view of the memory stop of FIG. 1 mounted on the gearbox of FIG. 1.

FIG. 3 shows the memory stop 100 attached to the gearbox 108. FIG. 4 shows a partially exploded view of the memory stop 100 and the gearbox 108. As shown in FIGS. 3 and 4, in various embodiments, in addition to the securing bolts 230 securing the cover plate 102 to the gearbox 108, the cover plate 102 may also include lifting eye bolts 324. In various embodiments, the lifting eye bolts 324 are secured in the connecting bores 228 of the cover plate 102 and attached to the body 128 of the gearbox 108. In various embodiments, the lifting eye bolts 324 may be utilized to lift the memory stop 100 or the memory stop 100 mounted on the gearbox 108 through lifting mechanisms such as the operator's hand or hands, ropes, chains, or various other suitable lifting mechanisms. In the present embodiment, the cover plate 102 includes two lifting eye bolts 324. The number of lifting eye bolts 324 should not be considered limiting on the current disclosure as in various other embodiments, any desired number of lifting eye bolts 324, including zero lifting eye bolts 324, may be utilized.

The bracket body 256 of the memory bracket 106 includes a top side 304 and a bottom side 306. The bracket body 256 includes a first end 310 and a second end 312. As shown in FIG. 3, in various embodiments, the bracket body 256 is arcuate between the first end 310 and the second end 312. The shape of the bracket body 256 should not be considered limiting on the current disclosure. In various embodiments, the stopper channel 258 is arcuate between a first stopper channel end 316 and a second stopper channel end 318 such that the stopper channel 258 defines an arcuate path for the stopper 302 to move along for easy radial positioning of the stopper 302. In various other embodiments, the stopper channel 258 may have other shapes defining a path for the stopper 302 to move along.

In the present embodiment, the memory bracket 106 includes two bracket legs 308a,b; however, the number of bracket legs 308 should not be considered limiting on the current disclosure as in various other embodiments, any desired number of bracket legs 308 may be utilized. As shown in FIG. 3, in the present embodiment, the bracket leg 308a is attached to the bracket body 256 at the first end 310 and the bracket leg 308b is attached to the bracket body 256 at the second end 312.

In various embodiments, the memory stop 100 defines an indicator channel 314 between the bottom side 306 of the memory bracket 106, the top side 224 of the cover plate 102, the bracket leg 308a, and the bracket leg 308b. As shown in FIG. 3, the indicator arm 246 of the indicator plate 104 is positioned within the indicator channel 314. The indicator arm 246 is adapted to move within the indicator channel 314 between the bracket legs 308a,b as the quad gear segment 204 connected to the indicator plate 104 and valve stem 200 is rotated.

The indicator arm 246 may engage the bracket legs 308a,b within the indicator channel 314. A distance between the bracket legs 308a,b defines a maximum rotational motion of the indicator arm 246. Because the indicator arm 246 of the indicator plate 104 is connected to the valve stem 200 through the quad gear segment 204, the distance between the bracket legs 308a,b also defines a maximum rotational motion of the quad gear segment 204 and the valve stem 200. In this manner, the rotation of the indicator arm 246 directly correlates to rotation of the valve stem 200 at a 1:1 ratio in the current embodiment because both are connected to the quad gear segment 204. Accordingly, a position of the indicator arm 246 directly indicates a position of the valve stem 200 and thereby a position of the plug.

As described above, in various embodiments, the operator may change the orientation of the memory bracket 106 relative to the cover plate 102 to control whether clockwise rotation of the input shaft 130 moves the plug of the valve assembly 110 to the open position and counter-clockwise rotation of the input shaft 130 moves the plug of the valve assembly 110 to the closed position, or vice versa. In various embodiments, when the indicator arm 246 is positioned within the indicator channel 314 proximate to or engaging the bracket leg 308b, the plug is in the fully opened position, and when the indicator arm 246 is positioned within the indicator channel 314 proximate to or engaging the bracket leg 308a, the plug is in the fully closed position. In various other embodiments, when the indicator arm 246 is positioned within the indicator channel 314 proximate to or engaging the bracket leg 308b, the plug is in the fully closed position, and when the indicator arm 246 is positioned within the indicator channel 314 proximate to or engaging the bracket leg 308a, the plug of the valve assembly 110 is in the fully open position.

As shown in FIG. 3, in various embodiments, the memory bracket 106 is graduated and includes a plurality of graduation marks 320. In the present embodiment, the graduation marks 320 of the memory bracket 106 are spaced in 10° increments between 0° and 90°; however, in various other embodiments, the graduation marks 320 of the memory bracket 106 may be spaced at various other increments and in a range other than between 0° and 90°. In various other embodiments, the graduation marks 320 may be spaced at increments corresponding to various percentages of a characteristic of the fluid flowing through the valve assembly 110, as described in greater detail below with reference to FIG. 19. For example, in various embodiments, the graduation marks 320 may be spaced at various percentages of flow through the valve assembly 110, various head loss pressures across the valve assembly 110, various velocities of fluid through the valve assembly 110, or various other characteristics of the fluid flowing through the valve assembly 110. The graduation marks 320 may be spaced at 5 percentage increments, 10 percentage increments, 25 percentage increments, or any other desired increments.

As shown in FIG. 3, the memory stop 100 includes the stopper 302 positioned within the stopper channel 258 of the memory bracket 106. In various embodiments, the stopper 302 extends through the stopper channel 258 and into the indicator channel 314 such that the stopper 302 engages the indicator arm 246. The stopper 302 is adapted to be moved within the stopper channel 258 of the memory bracket 106 and secured to the bracket body 256 at various locations along the stopper channel 258 between the first stopper channel end 316 and the second stopper channel end 318.

FIG. 4 discloses the stopper 302 including a bolt 400, a first washer 402, a second washer 406, and a nut 404. In various embodiments, the bolt 400 extends through the stopper channel 258 and into the indicator channel 314. The first washer 402 contacts the top side 304 of the bracket body 256 of the memory bracket 106 and the second washer 406 contacts the bottom side 306 of the bracket body 256 of the memory bracket 106. In various embodiments, the bolt 400 includes threading that the nut 404 engages to secure the bolt 400 within the stopper channel 258 at a desired position. The nut 404 may be unsecured such that the bolt 400 and therefore stopper 302 may be moved and secured at various locations within the stopper channel 258. The disclosure of the bolt 400, the first washer 402, the second washer 406, and the nut 404 should not be considered limiting on the current disclosure as in various other embodiments, the stopper 302 may include any components that may be moved within the stopper channel 258 and selectively secured to the memory bracket 106 at various locations along the stopper channel 258.

In various embodiments, the position at which the stopper 302 is secured within the stopper channel 258 defines a memory position. In various embodiments, the stopper 302 is secured within the stopper channel 258 at one of the graduation marks 320 on the bracket body 256. In various embodiments, the graduation marks 320 correspond directly with the degree to which the plug of the valve assembly 110 is angled open or closed. As described in greater detail below, the degree to which the plug of the valve assembly 110 is angled open or closed is related to head loss pressure within the valve assembly 110, velocity of a fluid through the valve assembly 110, and flow through the valve assembly 110. In this manner, the position of the stopper 302 within the stopper channel 258 may be varied to control the head loss pressure within the valve assembly 110, velocity of a fluid through the valve assembly 110, and flow through the valve assembly 110.

In various embodiments, the indicator arm 246 engages the stopper 302 at the memory position. The stopper 302 at the memory position limits the rotational motion of the indicator arm 246 to between the bracket leg 308a and stopper 302 within the indicator channel 314 or between the bracket leg 308b and the stopper 302 within the indicator channel 314. As the quad gear segment 204 rotates the indicator plate 104 and the indicator arm 246, the memory bracket 106 and cover plate 102 remain stationary relative to the quad gear segment 204 and indicator plate 104 and do not move as the quad gear segment 204 and indicator plate 104 are rotated.

Figures 5, 6:
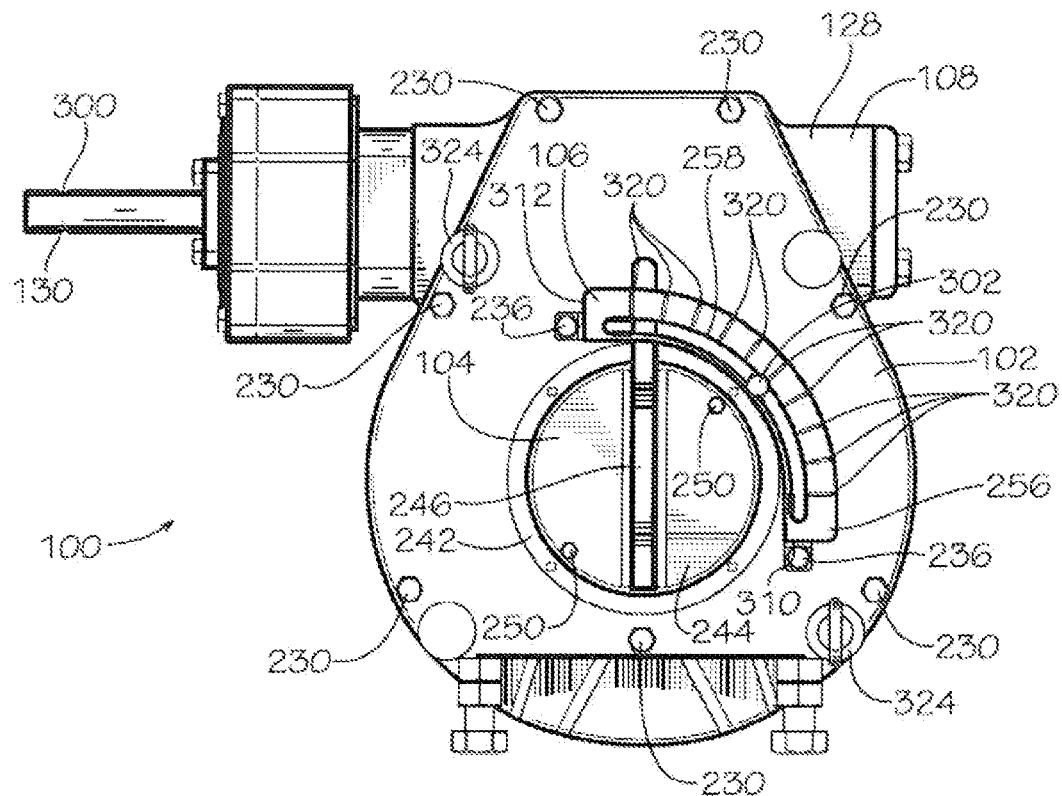
FIG. 5 is a top view of the memory stop of FIG. 1 mounted on the gearbox of FIG. 1.
FIG. 6 is a side view of the memory stop of FIG. 1 mounted on the gearbox of FIG. 1.

FIG. 5 shows a top view of the memory stop 100 mounted on the gearbox 108. FIG. 6 shows a side view of the memory stop 100 mounted on the gearbox 108.

FIGS. 7-10 show the memory bracket 106. As shown in FIG. 7, the memory bracket 106 includes the bracket body 256 defining the stopper channel 258 and having the bracket legs 308a,b. In various embodiments, each bracket leg 308a,b includes a leg tab 700a,b, respectively. Each leg tab 700a,b defines a tab bore 702a,b, respectively. In various embodiments, the tab bores 702a,b are dimensioned to receive the retaining bolts 236 through the leg tabs 700a,b, respectively, to secure the memory bracket 106 to the cover plate 102. Depending on the orientation of the memory bracket 106, the tab bores 702a,b may be aligned with the retaining bores 234a,b, respectively, or may be aligned with the retaining bores 234c,d, respectively. In various embodi- ments, the leg tabs 700a,b are orthogonal to the bracket legs 308a,b, respectively and the bracket legs 308a,b are orthogonal to the bracket body 256. However, the orienta- tion of the leg tabs 700a,b relative to the bracket legs 308a,b or the orientation of the bracket legs 308a,b relative to the bracket body 256 should not be considered limiting on the current disclosure.

As shown in FIG. 7, the top side 304 of the memory bracket 106 defines a top side surface 704. In various embodiments, the graduation marks 320 are defined in the top side surface 704. In various other embodiments, the graduation marks 320 are attached to the top side surface 704. In various embodiments, the graduation marks 320 are decals or other indicators attachable to the memory bracket 106. In various other embodiments, the graduation marks 320 may be molded, cast, stamped, cut, painted, or applied to the memory bracket 106 through any other suitable mechanism.

Figure 10:
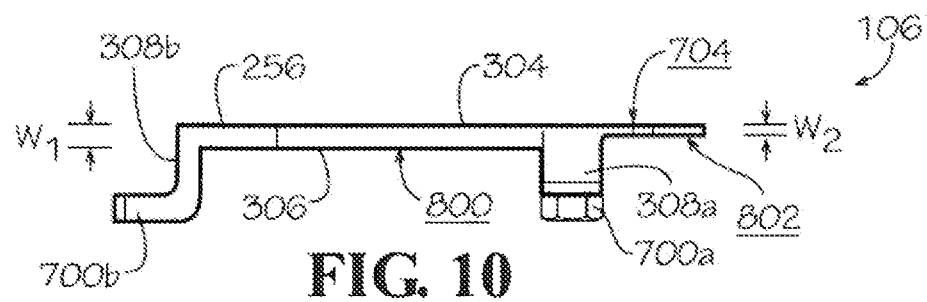
FIG. 10 is a side view of the memory bracket of FIG. 1.

As shown in FIG. 8, in various embodiments, the bottom side 306 includes a bottom side surface 800 and a recessed surface 802. In various embodiments, a thickness of the bracket body 256 between the top side surface 704 and the bottom side surface 800 is greater than a thickness of the bracket body 256 between the top side surface 704 and the recessed surface 802. As shown in FIG. 8, the stopper channel 258 is defined through the body 256 from the top side surface 704 to the bottom side surface 800. In various embodiments, as shown in FIG. 10, a thickness $W_1$ from the top side surface 704 to the bottom side surface 800 is greater than a thickness $W_2$ from the top side surface 704 to the recessed surface 802. Because the body 256 is thicker between the top side surface 704 and the bottom side surface 800, the body 256 may more securely support the stopper 302 within the stopper channel 258.

As shown in FIG. 9, in various embodiments, two adja- cent graduation marks 320 are spaced by an angular distance of θ. In the present embodiment, θ is 10°; however, in various other embodiments, θ may be any other desired angle. In various other embodiments, the angular distance between two adjacent graduation marks 320 may be differ- ent from an angular distance between another two adjacent graduation marks 320.

Figure 11:
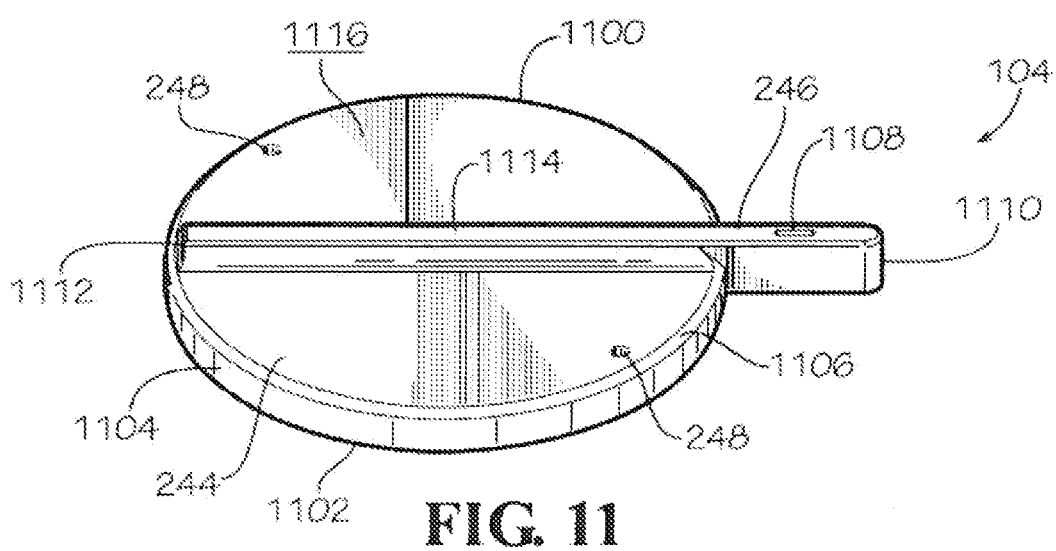
FIG. 11 is a perspective view of the indicator plate of FIG. 1.
Figure 12:
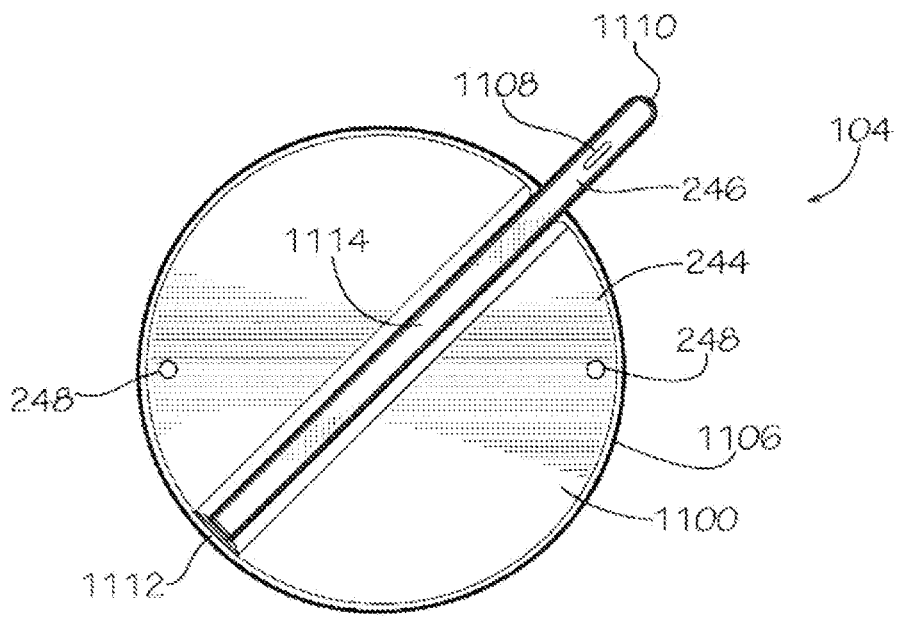
FIG. 12 is a top view of the indicator plate of FIG. 1.
Figure 13:
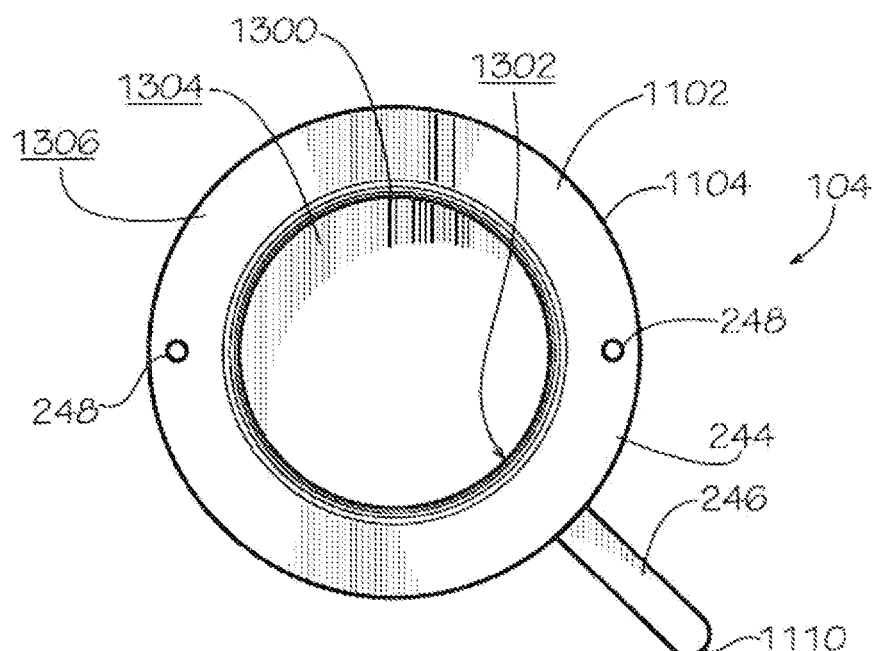
FIG. 13 is a bottom view of the indicator plate of FIG. 1.

FIGS. 11-13 show the indicator plate 104. The indicator plate 104 includes the hub 244 and the indicator arm 246. In various embodiments, the hub 244 and indicator arm 246 are monolithically formed. In various other embodiments, the indicator arm 246 is attached to the hub 244 through attachment mechanisms such as welding, adhesives, glues, nuts and bolts, pins, or various other attachment mecha- nisms.

In various embodiments, the hub 244 includes a top side 1100, a bottom side 1102, and a lateral side 1104. The hub 244 defines a top side surface 1116 at the top side 1100. As shown in FIG. 11, in various embodiments, the hub 244 defines a tapered edge 1106 between the top side 1100 and the lateral side 1104. In various embodiments, the lateral side 1104 has a circular profile; however the profile of the hub 244 should not be considered limiting on the current disclosure as in various other embodiments, the hub 244 may have any desired shape profile.

The indicator arm 246 is on the top side 1100 of the hub 244 and includes a body 1114 having a first end 1110 and a second end 1112. In various embodiments, the body 1114 projects upwards from the top side surface 1116 of the hub 244. The first end 1110 extends away from the hub 244 such that the first end 1110 is positioned beyond the lateral side 1104 of the hub 244. In various embodiments, the indicator arm 246 includes a position indicator 1108. The position indicator 1108 may be defined in the indicator arm 246 or may be attached to the indicator arm 246. In various embodiments, the position indicator 1108 may be omitted.

FIG. 12 shows a top view of the indicator plate 104. FIG. 13 shows a bottom view of the indicator plate 104. As shown in FIGS. 12 and 13, the indicator plate bores 248 extend through the hub 244 from the top side 1100 to the bottom side 1102, respectively. As shown in FIG. 13, the bottom side 1102 of the indicator plate 104 defines a bottom side surface 1306. In various embodiments, the hub 244 includes a hub cavity 1300 at the bottom side 1102. In various embodiments, the hub cavity 1300 includes a cavity side surface 1302 and a cavity bottom surface 1304. In various embodiments, the hub cavity 1300 covers the gear bore 210 of the quad gear segment 204 when the indicator plate 104 is secured to the quad gear segment 204.

Figure 14:
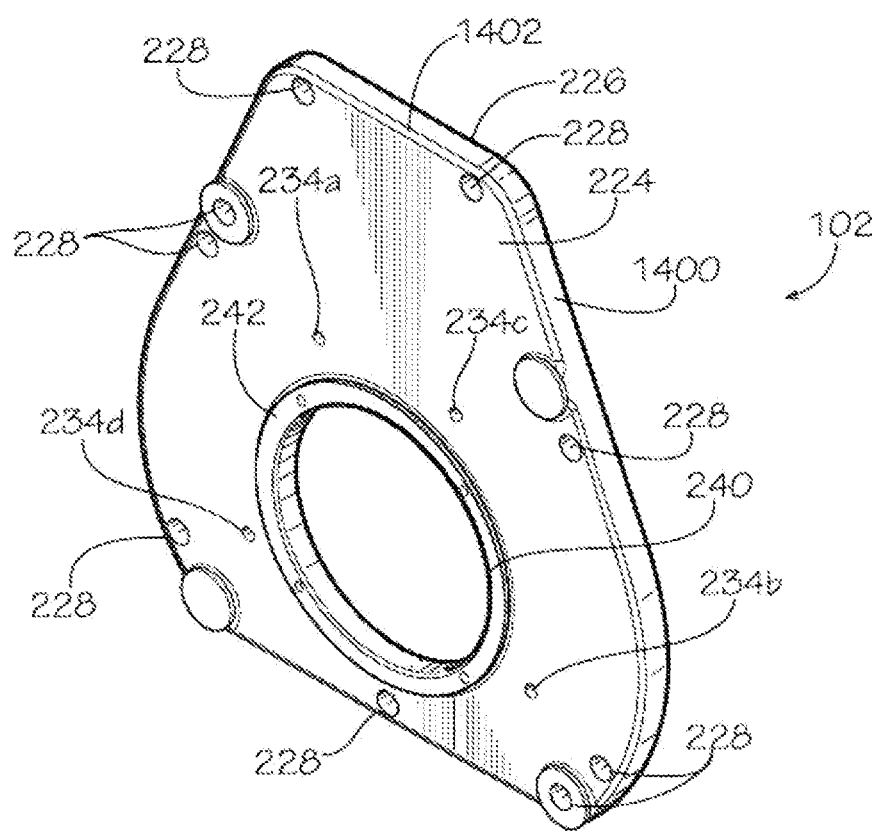
FIG. 14 is a perspective view of the cover plate of FIG. 1.
Figure 16:
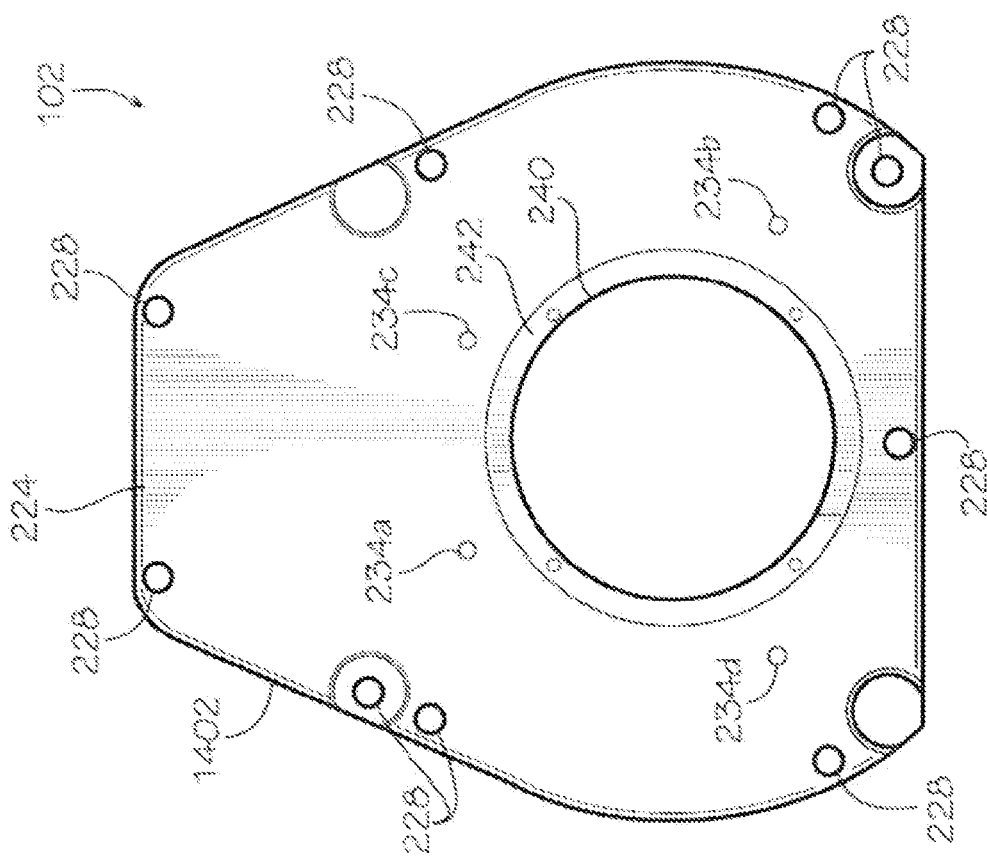
FIG. 16 is a top view of the cover plate of FIG. 1.
Figure 15:
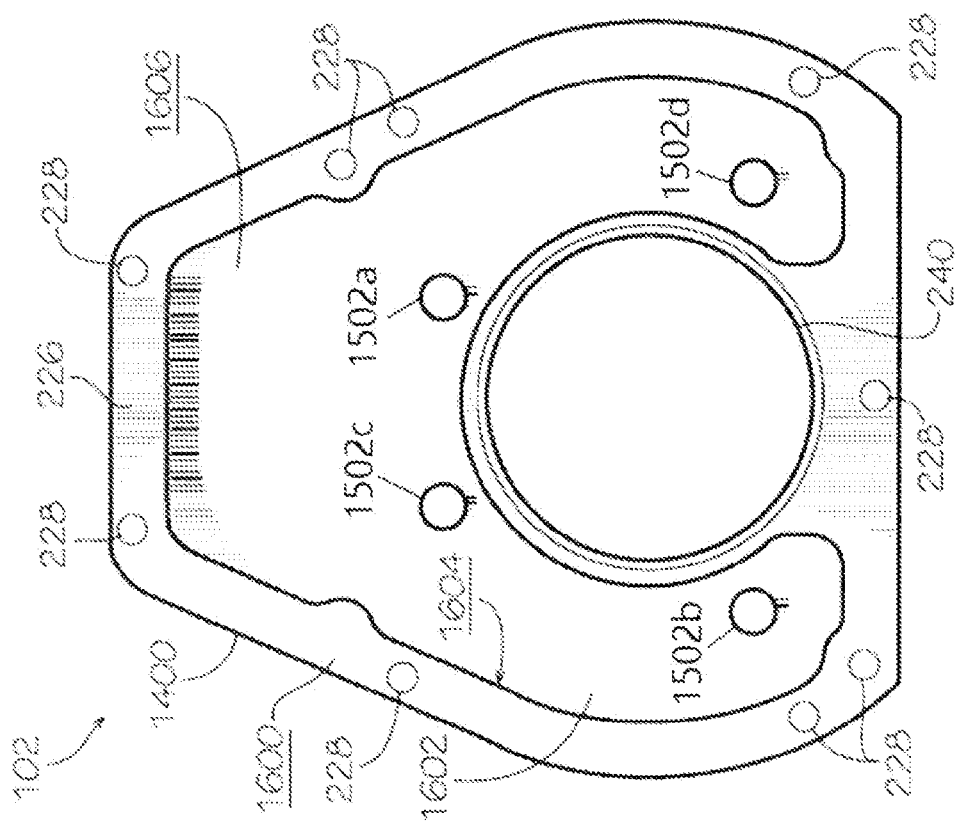
FIG. 15 is a bottom view of the cover plate of FIG. 1.

FIGS. 14-16 show the cover plate 102. The cover plate 102 includes the top side 224 and the bottom side 226. The cover plate 102 also includes the connecting bores 228, retaining bores 234, and the segment bore 240. The segment collar 242 is positioned on the top side 224 surrounding the segment bore 240. The cover plate 102 may also include position indicators (not shown) defined on the top side 224 in various embodiments.

As shown in FIG. 14, the cover plate 102 includes a lateral side 1400. In various embodiments, the cover plate 102 includes a tapered edge 1402 between the lateral side 1400 and the top side 224. The lateral side 1400 defines a profile shape of the cover plate 102. In various embodiments, the cover plate 102 has a shape which matches a profile shape of the gearbox 108 to which the cover plate 102 is secured. The shape of the cover plate 102 or the gearbox 108 should not be considered limiting on the current disclosure as the cover plate 102 or gearbox 108 may have any desired shape in various embodiments.

FIG. 15 shows a bottom view of the cover plate 102. FIG. 16 shows a top view of the cover plate 102. As shown in FIGS. 15 and 16, the connecting bores 228 and the segment bore 240 are defined through the cover plate 102 and extend from the top side 224 to the bottom side 226, respectively. In various embodiments, the retaining bores 234 are defined in the cover plate 102 and extend into the cover plate 102 from the top side 224. In various embodiments, the retaining bores 234 are blind holes and do not extend from the top side 224 to the bottom side 226, though the retaining bores 234 may be through holes in various other embodiments. In the present embodiment, the lifting bolts 324 are attached in two of the connecting bores 228 and securing bolts 230 are attached in the remaining connecting bores 228. In various embodiments, the bottom side 226 of the cover plate 102 defines a bottom side surface 1600. In various embodiments, the cover plate 102 includes a cover cavity 1602 at the bottom side 226. As shown in FIG. 15, cover cavity 1602 includes a cavity side surface 1604 and the cavity bottom surface 1606.

Figure 17:
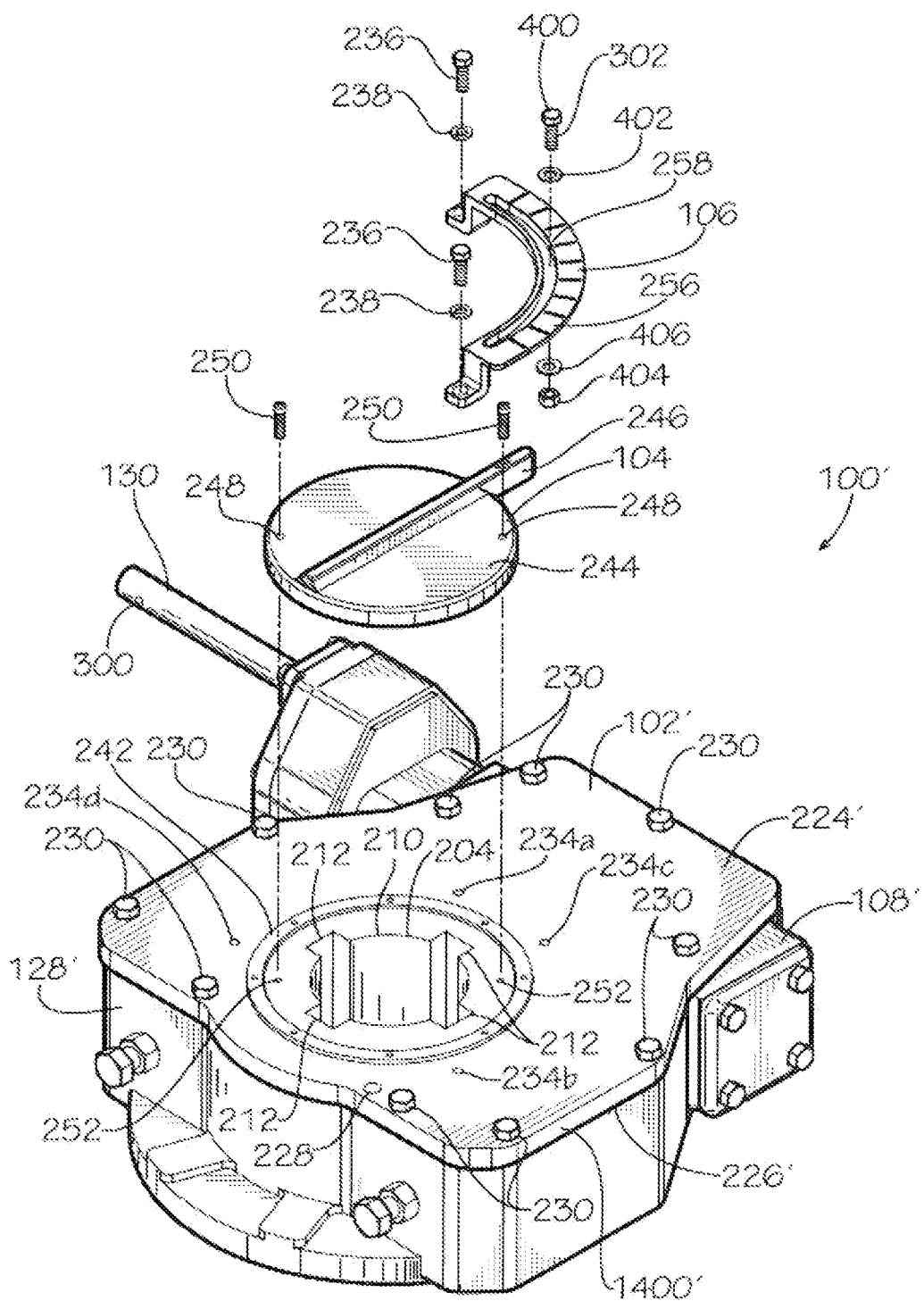
FIG. 17 is a partially-exploded perspective view of a memory stop according to another embodiment of the present disclosure mounted on a gearbox, the memory stop including a cover plate, the indicator plate of FIG. 1, and the memory bracket of FIG. 1.

FIG. 17 shows another embodiment of a memory stop 100' including a cover plate 102', the memory bracket 106, and the indicator plate 104 mounted on a gearbox 108'. As shown in FIG. 17, the cover plate 102' includes a top side 224', a bottom side 226', and a lateral side 1400'. The lateral side 1400' defines a profile shape of the cover plate 102' when viewed from a direction normal to the top side 224', which may be dimensioned to match a shape of the gearbox 108' when viewed from the same perspective. Each of the shape of the cover plate 102' and the shape of the gearbox 108' is different from the shape of the cover plate 102 and the shape of the gearbox 108', respectively. None of the shape of the cover plate 102', the shape of the cover plate 102, the shape of the gearbox 108', or the shape of the gearbox 108 should be considered limiting on the current disclosure.

The gearbox 108' may be similar to the gearbox 108 and may include the input shaft 130 connected to a gear (not shown) housed in a body 128' of the gearbox 108'. In various embodiments, the gear is engaged with a quad gear segment (not shown), which may be engaged with a valve stem (not shown). The cover plate 102' is secured to the gearbox 108' through the securing bolts 230. In the present embodiment, the memory stop 100' includes ten securing bolts 230; however the number of securing bolts 230 should not be considered limiting on the current disclosure. The disclosure of the gearbox 108' having the body 128', gear, and quad gear segment should not be considered limiting on the current disclosure as in various other embodiments, any suitable gearbox or actuating mechanism may be utilized.

Figure 18:
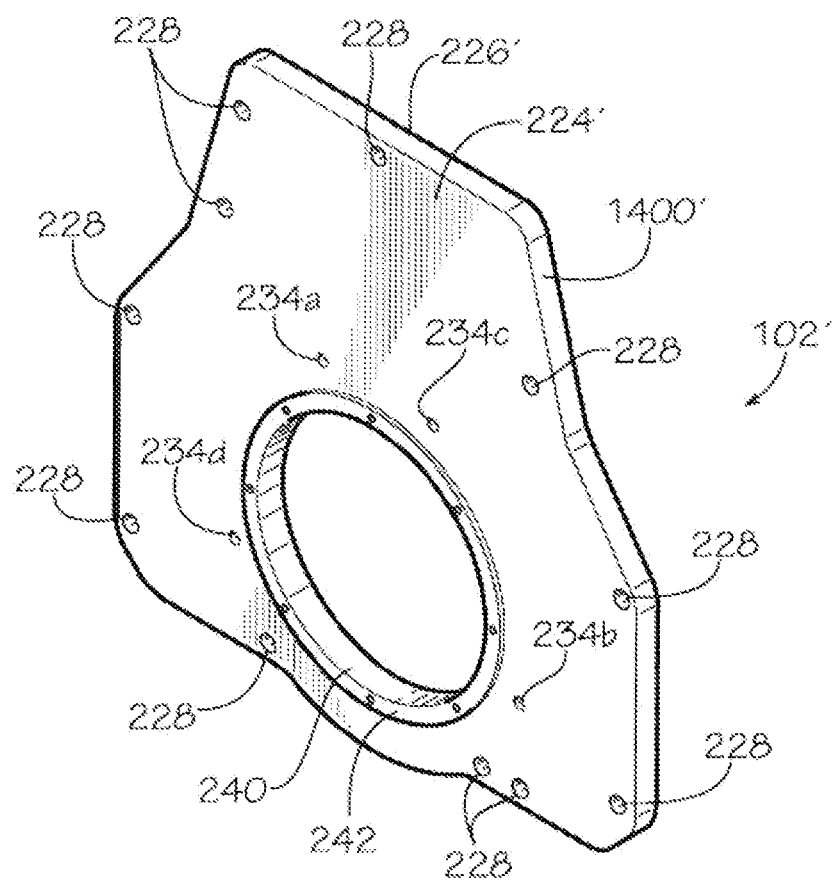
FIG. 18 is a perspective view of the cover plate of FIG. 17.

FIG. 18 shows the cover plate 102'. Similar to the cover plate 102, the cover plate 102' includes the top side 224' and the bottom side 226'. The cover plate 102' also includes the connecting bores 228 and the segment bore 240 defined through the cover plate 102' and extending from the top side 224' to the bottom side 226'. The cover plate 102' also includes the retaining bores 234 defined in the cover plate 102' and extending from the top side 224' into the cover plate 102'. In the present embodiment, the retaining bores 234 are blind holes; however, in various other embodiments, the retaining bores 234 may be through holes.

In the present embodiment, the cover plate 102' includes eleven connecting bores 228; however, the number of connecting bores 228 should not be considered limiting on the current disclosure as in various other embodiments, any desired number of connecting bores 228 may be utilized. In the present embodiment, the cover plate 102' includes four retaining bores 234; however, the number of retaining bores 234 should not be considered limiting on the current disclosure. The segment collar 242 is positioned on the top side 224' surrounding the segment bore 240. The cover plate 102' may also include position indicators (not shown) defined on the top side 224' in various embodiments.

FIG. 19 is a chart showing the relationship between a head loss pressure across the valve assembly 110 in pounds per square inch (psi), a velocity of a fluid through the valve assembly 110 in feet per second (ft/s), a position of a plug of the valve assembly 110 (in degrees open where "Full" is 90 degrees or completely open), and flow through the valve assembly 110 in gallons per minute (gpm). In various embodiments, the operator may use the chart shown in FIG. 19 or another similar chart to determine the position to which the plug should be opened to obtain a desired fluid velocity, flow, and head loss pressure within the valve assembly 110. In various embodiments, the operator may use the chart shown in FIG. 19 with the memory stop 100 and set the stopper 302 at the desired open angle, indicated by the graduation marks 320, within the stopper channel 258, to more accurately and efficiently achieve a desired head loss pressure, velocity of fluid, or flow through the valve assembly 110.

A method of using the memory stop 100 is also disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. The memory stop 100 including the cover plate 102, indicator plate 104, and memory bracket 106 is mounted on the gearbox 108 of the valve assembly 110.

The stopper 302 is positioned and secured at a desired location in the stopper channel 258 of the memory bracket 106. In various embodiments, the stopper 302 is positioned within the stopper channel 258 between the first stopper channel end 316 and the second stopper channel end 318. The stopper 302 extends through the stopper channel 258 and into the indicator channel 314. The position at which the stopper 302 is secured in the stopper channel 258 is the memory position. In various embodiments, the operator determines the memory position by consulting flow charts, such as those shown in FIG. 19, to get the desired balance of fluid velocity, fluid flow, and head loss pressure within the valve assembly 110.

The operator actuates the gear 202 and quad gear segment 204 of the gearbox 108 through the hand wheel 132 or other similar mechanism. The operator rotates the hand wheel 132 such that the gear 202 actuates the quad gear segment 204, which thereby rotates the valve stem 200 connected to the quad gear segment 204, which moves the plug of the valve assembly 110 between the closed position and memory position or between the open position and the memory position.

Because the indicator plate 104 is secured to the quad gear segment 204, as the quad gear segment 204 rotates, the indicator arm 246 of the indicator plate 104 is moved within the indicator channel 314 between the bracket leg 308a and the stopper 302. Alternatively, the indicator arm 246 may move within the indicator channel 314 between the bracket leg 308b and the stopper 302, depending on the orientation of the memory stop 100. The stopper 302 engages the indicator arm 246 at the memory position and prevents further movement within the indicator channel 314 past the stopper 302. Engagement of the indicator arm 246 with the stopper 302 prevents the operator from opening or closing the plug through the hand wheel 132 past the memory position.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. Additionally, directional references such as "up," "down," "top," "left," "right," "front," "back," and "corners," among others are intended to refer to the orientation as illustrated in the figure (or figures) to which the components and directions are referencing.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of using a memory stop comprising:
   moving a stopper of the memory stop to a memory position, the memory stop including a cover plate,
      a memory bracket secured to the cover plate and defining a plurality of stopper positions, and
      the stopper attached to the memory bracket;
   securing the stopper to the memory bracket at the memory position, wherein the memory position is at one of the plurality of stopper positions; and
   rotating an input shaft of a gearbox connected to the memory stop, wherein the cover plate of the memory stop is connected to the gearbox, wherein rotating the input shaft comprises:
   driving a gear segment;
   rotating a valve stem secured to the gear segment,
   rotating an indicator plate secured to the gear segment, the indicator plate including a hub and an indicator arm; and
   rotating the hub and the indicator arm of the indicator plate such that the indicator arm moves within an indicator channel defined between a bottom surface of the memory bracket and the cover plate.

2. The method of claim 1, wherein rotating the input shaft further comprises rotating the hub and the indicator arm of the indicator plate such that the indicator arm engages the stopper.

3. The method of claim 1, wherein the memory position is a first memory position, and wherein the first memory position is associated with a first flow rate through a valve, the method further comprising:
   unfastening the stopper from the memory bracket;
   moving the stopper to a second memory position, wherein the second memory position is at a second of the plurality of stopper positions, and wherein the second memory position is associated with a second flow rate through the valve; and
   securing the stopper to the memory bracket at the second memory position.

4. A system comprising:
   a gearbox including an input shaft and a gear segment, the input shaft configured to rotate the gear segment within the gearbox;
   a valve stem secured to the gear segment, the input shaft configured to rotate the valve stem with the gear segment; and
   a memory stop including a cover plate secured to the gearbox, the memory stop further including:
      a memory bracket secured to the cover plate and including a bottom surface facing the cover plate, the memory bracket defining a plurality of stopper positions, the memory bracket further defining an indicator channel between the cover plate and the bottom surface of the memory bracket; and
      a stopper attached to the memory bracket at one of the plurality of stopper positions;
      an indicator plate comprising a hub and an indicator arm, the hub secured to the gear segment, the indicator arm positionable within the indicator channel and engageable with the stopper at a memory position,
      wherein the input shaft is configured to rotate the indicator plate with the gear segment relative to the cover plate, the memory bracket and the stopper.

5. The system of claim 4, wherein the memory bracket includes a first bracket leg and a second bracket leg, and wherein the indicator arm is positioned between the first bracket leg and the second bracket leg.

6. The system of claim 4, wherein the cover plate defines a segment bore and a segment collar surrounding the segment bore, wherein the hub is positioned over the segment bore of the cover plate, and wherein the hub is in contact with the cover plate at the segment collar.

7. The system of claim 4, wherein the memory bracket includes an arcuate body defining a stopper bracket, and wherein the memory bracket defines an arcuate stopper channel.

8. The system of claim 4, wherein the stopper includes a bolt and a nut, and wherein the bolt is secured to the memory bracket through the nut.

9. The system of claim 4, wherein the memory bracket is graduated at 10° increments between 0° and 90°.

10. The system of claim 4, wherein the hub and the indicator arm of the indicator plate are rotatable with the gear segment.

\* \* \* \* \*